United States Patent [19]

Davison

[11] 3,970,771

[45] July 20, 1976

[54] SUBSTRATE COATED WITH MIXED RESIN PRIMER COAT COMPRISING A BLOCK COPOLYMER

[75] Inventor: Sol Davison, Houston, Tex.

[73] Assignee: Shell Oil Company, Houston, Tex.

[22] Filed: Nov. 25, 1974

[21] Appl. No.: 526,882

[52] U.S. Cl. ............................. 428/425; 260/876 B; 260/880 B; 427/407; 427/417; 428/482; 428/483; 428/497; 428/517; 428/519; 428/520; 428/521; 428/522; 428/523

[51] Int. Cl.² .................... B32B 27/08; B32B 27/32; B32B 27/36; B32B 27/40

[58] Field of Search ............ 260/880 B, 879, 876 B; 427/407, 417; 428/425, 482, 483, 497, 517, 519, 520–523

[56] References Cited
UNITED STATES PATENTS

| | | | |
|---|---|---|---|
| 3,239,478 | 3/1966 | Harlan | 260/880 B |
| 3,325,430 | 6/1967 | Grasely | 260/880 B |
| 3,441,530 | 4/1969 | Bauer et al. | 260/880 B |
| 3,459,700 | 8/1969 | Richards | 260/880 B |
| 3,562,355 | 2/1971 | Holden | 260/880 B |
| 3,567,798 | 3/1971 | Haefele et al. | 260/880 B |
| 3,600,462 | 8/1971 | Harmon | 260/880 B |
| 3,607,977 | 9/1971 | Taylor et al. | 260/880 B |
| 3,666,701 | 5/1972 | Marrs | 260/880 B |
| 3,699,184 | 10/1972 | Taylor et al. | 260/880 B |
| 3,792,124 | 2/1974 | Davison | 260/880 B |
| 3,823,203 | 7/1974 | De La Mare | 260/880 B |

*Primary Examiner*—J.C. Cannon

[57] ABSTRACT

This invention relates to articles comprising a coating bonded to a substrate by means of an intervening bond-promoting primer, the latter comprising certain selectively hydrogenated block copolymers and a resin compatible with the non-elastomeric blocks of the copolymer and, in some instances, also including a carboxylated resin.

5 Claims, No Drawings

SUBSTRATE COATED WITH MIXED RESIN PRIMER COAT COMPRISING A BLOCK COPOLYMER

BACKGROUND OF THE INVENTION

In the development of coated articles the problem often arises of adequate bonding of the coating to a substrate. This is especially true when the substrate surfaces comprise a "low energy surface", namely one which is essentially hydrocarbon. Such substrates may comprise, for example — alpha olefin polymers, rubbers, and block or graft copolymers of hydrocarbon monomers. Moreover, it has been found difficult to bond coating compositions, wherein the principal coating agent is a hydrocarbon polymer, particularly certain block copolymers, to high energy surfaces such as metals and the like.

It is an object of the present invention to provide improved coated articles. It is another object of the invention to provide a novel bonding composition of high flexibility and elasticity which is resistant to cracking on the applicaion of impact blows, or in the case of a flexible substrate, to bending. A more specific object is to provide a coated article wherein the substrate principally comprises a low-energy surface. Other objectives will become apparent during the following discussion.

Now, in accordance with the present invention, a coated article of manufacture is provided comprising a substrate, a primer coating and a topcoating in which the primer coat comprises a selectively hydrogenated block copolymer having at least two polymer blocks of a monoalkenyl arene and at least one hydrogenated polymer block of a conjugated diene and a substantial proportion of resin compatible with the monoalkenyl arene polymer blocks. In a preferred aspect of the invention, the primer coating composition also contains a substantial proportion of certain carboxylated resins as more fully defined hereinafter.

The substrates especially contemplated include low surface energy materials such as polyolefins, synthetic rubbers, graft copolymers, and hydrocarbon block copolymers as well as high surface energy substrates, particularly metals, such as copper, aluminum, steel and the like. The shape of the substrate is immaterial to the use of the present invention. For example, the substrate may take the form of wire, foil, automobile parts, and other mechanical goods or their components.

The topcoatings, which are contemplated for finishing these substrates, may comprise conventional lacquers, enamels, or paints, or nonconventional coatings, espcially those in which a major component is a block copolymer such as those to be described hereafter.

The essential aspect of this invention comprises the discovry of a novel priming composition which enables a tight bond to be created between a wide variey of substrates such as those listed above and a wide variety of coating compositions. The essential polymeric component in the primer composition is a selectively hydrogenated block copolymer. While the most simple configuration of such a copolymer is A—B—A, the present invention contemplates any of the configurations known to be possible in block copolymers including multi-block linear polymers as well as multi-block branched copolymers. The blocks A are polymer blocks predominating in monoalkenyl arenes such as styrene, alpha methyl styrene or tert-butyl styrene. These blocks may be modified with a minor proportion of copolymerizable monomers such as conjugated dienes.

The blocks B comprise principally hydrogenated polymer blocks of a conjugated diene, particularly where at least about 80 percent and preferably at least 95 percent of the double bonds in the polymer block have been reduced by hydrogenation. The average molecular weight of each of the blocks A should be between about 2,000 and 125,000, preferably between about 5,000 and 40,000. The average molecular weight of the polymer block B should be between about 10,000 and 250,000, preferably between about 25,000 and 150,000.

In addition to the block copolymer, the primer contains a resin largely compatible with the polymer blocks A. The term "compatible" means compatibility at the level used in the formulation. This can be readily determined by solution blending a homopolymer corresponding in identity to the end block, e.g., polystyrene with the resin in the proportion contemplated in the primer composition, and evaporating the solution to form a film. Clear films indicate that the resin is compatible and turbid films indicate that the resin is incompatible at the resin to polymer ratio.

The resins especially contemplated show a high degree of compatibility with the end blocks of the subject block copolymers in the range contemplated, with 50–150 parts by weight of resin for each 100 parts by weight of the block copolymer.

It is highly preferred that the primer composition contain no more than about 5 parts by weight of oil, based on the block copolymer and best results are obtained when the primer composition is oil-free.

The following types of resins compatible with the blocks A include:

END BLOCK RESIN

Coumarone-indene
Olefinic hydrocarbon resin
Rosin methyl ester
Vinyl toluene/alpha methyl styrene copolymer
Alpha methyl styrene copolymer
Polyindene resin
Poly (methyl indene) resin The primer compositions of this invention exhibit substantially broader effectiveness if they contain an additional type of resin, namely a carboxylated or esterified resin which is essentially halogen-free, the acid number of the resin being in the order of between 15 and 60. The precise identity of the resin is not as important as the availability of this relatively high concentration of carboxyl groups. Another important qualification, however, is that this carboxylated resin is at least partially compatible with the polymer blocks A and largely incompatible with the hydrogenated diene blocks B.

Types of carboxylated resins which are especially useful for the present purposes include the reaction products of unsaturated fatty acids, rosin acids, conjugated dienes or their mixtures with unsaturated polycarboxylic acids, and anhydrides or esters, and particularly the esterification products of such reaction mixtures wherein the esterifying agent is a polyhydric alcohol. Suitable unsaturated fatty acids include oleic, linoleic or linolenic acids as well as their naturally-occurring mixtures with rosin acids such as tall oil. Rosin or rosin acids and naturally occurring mixtures thereof may be employed. Suitable unsaturated polycarboxylic acids or their anhydrides are the following:
  Maleic acid
  Maleic anhydride
  Fumaric acid
  Citraconic anhydride
  Aconitric anhydride
  Itaconic anhydride The most preferred carboxylated resin for use in the priming compositions comprises the reaction products of rosin with maleic anhydride, the reaction products being esterifid with glycerol.

Commercially available topcoating compositions as well as developed metal topcoatings include the following which are only exemplary. It will be noted that the following list specifies commercially available brand name coatings:

| Paint Base | Brand Name |
|---|---|
| Nitrocellulose lacquer | DuPont 445 |
| Acrylic Lacquer | DuPont 996 |
| Soya alkyd | Beckosol 110-010 |
| Polyurethane | Durethane 100 |
| Block copolymer | — |

The other optional components which may be present in the priming composition include other types of resins in minor amounts, other types of resins in minor amounts, other types of polymers or stabilizes in minor amounts, and adhesion promoting or electrically conductive components such as certain high structure carbon blacks. It is especially contemplated that the substrate is coated with the primer composition by application of the latter in a relatively volatile solvent. However, other methods of applications such as hot melt, powder (by electrostatic or fluidized bed deposition) and latex are not excluded from successful use of this invention. The solvent may be chosen with respect to solubility of essentially all of the primer components therein. A suitable solvent includes mixtures of cyclohexane and methylethyl ketone in proportions varying from about 40:60 to 90:10. This may be sprayed, brushed, rolled or dipped for application. The desirable primer coating thickness after evaporation of the solvent is on the order of 0.05–0.5 mils.

The following examples illustrate the use of the present invention:

EXAMPLE 1

The substrate tested was polypropylene. The primer composition comprised equal parts by weight of a block copolymer and a coumarone-indene resin. The block copolymer had the structure; Polystyrene-completely hydrogenated butadiene-polystyrene, the block molecular weights being 9,000—47,000—9,000. The commercial designation of the coumarone-indene resin was: Cumar LX 509. The primer was applied to the polypropylene surface in a 10% toluene solution and the solvent permitted to evaporte. A commercially available polyurethane coating composition (Durethane 100) was applied and cured after which the Tape/Scribe Test (Ford Motor Co. Test Method BI 6-1, Pt. B) was utilized to determine the adhesion of the coating to the substrate which was found to be 100%. In the absence of the primer, adhesion was 0%. (In these adhesion tests, a special tool is used to scribe a total of 100 small squares each about 1/16 inch square into the paint. The tool has 11 cutting edges which is drawn down twice through the finish, the second draw being at right angles to the first draw. Scotch tape (3M, No. 710) is applied to the scribed area with firm thumb pressure. The tape is then removed by pulling one end at moderate speed at 90° angle to the surface. The number of squares remaining divided by 100 is reported as the percent adhesion).

EXAMPLE 2

A second type of primer composition was the same as the primer employed in Example 1 but modified with a maleic resin in an amount equal to the weight of the block copolymer. This was applied to polypropylene and subsequently top-coated with four commercially available coatings and tested eventually by the Tape/Scribe Test. Adhesion was 100% in all cases. In the absence of the primer, adhesion was 0% in all cases. The coatings tested were as follows:

| Paint Type | Trade Name or Manufacturer |
|---|---|
| Nitrocellulose Lacquer | DuPont 445 |
| Acrylic Lacquer | DuPont 996 |
| Soya Alkyd | Cook Company |
| Polyurethane | Durethane |

EXAMPLE 3

A substrate composition comprised of the following:

| | Parts by Weight |
|---|---|
| Block Copolymer | 100 |
| Extender oil | 100 |
| Polypropylene | 120 |
| Whiting | 150 |
| Carbon Black | 15 |

In the absence of any primer, a polyurethane paint (Durethane 100) would not adhere to this substrate. When the substrate was primed with the primer described in Example 2, adhesion was perfect as measured by the Scribe/Test described in Example 1.

What is claimed is:

1. A coated article of manufacture comprising a substrate surface bearing a primer coat and a top coat, said primer coat being adherent both to the substrate and the top coating, wherein said primer coat contains no oil component and comprises:
  a. a selectively hydrogenated block copolymer having at least two polymer blocks A and at least one polymer block B, each block A being a non-elastomeric polymer block of a monoalkenyl arene having an average molecular weight between about 2,000 and about 125,000 and each block B being a hydrogenated polymer block of a conjugated diene wherein at least 80% of the double bonds have been reduced by hydrogenation and wherein block B has an average molecular weight between about 10,000 and 250,000;
  b. 50–150 parts by weight per 100 parts by weight of said block copolymer of a first resin being compatible with the blocks A in the proportions employed, wherein said first resin is selected from the group consisting of coumarone-indene resins, olefinic hydrocarbon resins, rosin methyl ester, vinyl toluene/alphamethyl styrene copolymer, alphamethyl styrene copolymer, polyindene resin, and poly(methyl indene)resin; and c. 50–150 parts by weight per 100 parts by weight of said block copolymer of a halogen-free carboxylated second resin, having an acid number between 15 and 60, said second resin comprising the reaction product of a component C of the group consisting of conjugated dienes, rosin, unsaturated fatty acids, and mixtures thereof with a component D of the group consisting of unsaturated polycarboxylic acids, and anhydrides or esters thereof, said resin being at least partially compatible with blocks A and largely incompatible with hydrogenated diene block B.

2. An article according to claim 1 wherein the substrate comprises a block copolymer as defined with reference to the primer.

3. An article according to claim 1 wherein the top coating comprises a block copolymer as described with reference to the primer.

4. An article according to claim 1 wherein the top coating comprises a polyurethane.

5. An article according to claim 1 wherein the first resin in the primer is a coumarone-indene resin.

* * * * *